(12) United States Patent
Longo et al.

(10) Patent No.: US 7,063,885 B2
(45) Date of Patent: Jun. 20, 2006

(54) BIAXIALLY ORIENTED AND HEAT-SET MULTILAYER THERMOPLASTIC FILM FOR PACKAGING

(75) Inventors: Eugenio Longo, Rho (IT); Roberto Forloni, Garbatola di Nerviano (IT); Gregorio Di Cesare, Cerro Maggiore (IT)

(73) Assignee: Cryovac, Inc., Duncan, SC (US)

( * ) Notice: Subject to any disclaimer, the term of this patent is extended or adjusted under 35 U.S.C. 154(b) by 80 days.

(21) Appl. No.: 10/221,429

(22) PCT Filed: Feb. 27, 2001

(86) PCT No.: PCT/EP01/02229

§ 371 (c)(1),
(2), (4) Date: Dec. 26, 2002

(87) PCT Pub. No.: WO01/68363

PCT Pub. Date: Sep. 20, 2001

(65) Prior Publication Data

US 2004/0009360 A1 Jan. 15, 2004

(30) Foreign Application Priority Data

Mar. 13, 2000 (EP) .................................. 00105242

(51) Int. Cl.
*B32B 27/32* (2006.01)
*B32B 27/34* (2006.01)

(52) U.S. Cl. .............. 428/220; 264/171.28; 264/209.5; 264/514; 264/211.12; 428/474.9; 428/475.8; 428/476.1; 428/910; 430/531; 430/532; 430/536

(58) Field of Classification Search ............ 428/476.1, 428/475.8, 474.9, 910, 220; 264/171.28, 264/209.5, 514; 430/531, 532, 536
See application file for complete search history.

(56) References Cited

U.S. PATENT DOCUMENTS

| 4,469,754 | A |   | 9/1984 | Hoh et al. |
| 4,568,580 | A |   | 2/1986 | Ghirardello et al. ........... 428/35 |
| 4,900,612 | A | * | 2/1990 | Sato et al. .................... 428/216 |
| 4,908,272 | A |   | 3/1990 | Harada et al. ............... 428/412 |
| 5,160,767 | A |   | 11/1992 | Genske et al. |
| 5,763,095 | A | * | 6/1998 | Ramesh et al. .......... 428/474.4 |
| 6,476,137 | B1 |   | 11/2002 | Longo |
| 6,602,455 | B1 | * | 8/2003 | Forloni .................. 264/173.15 |

FOREIGN PATENT DOCUMENTS

| EP | 0 358 038 | 8/1989 |
| EP | 0 465 931 | 6/1991 |
| EP | 0 685 510 | 6/1995 |
| EP | 0 719 631 | 12/1995 |
| EP | 0 967 073 | 6/1999 |
| JP | 54015981 | 2/1979 |
| JP | 4052137 | 2/1992 |

* cited by examiner

*Primary Examiner*—Ana Woodward
(74) *Attorney, Agent, or Firm*—Mark B. Quatt

(57) ABSTRACT

A multi-layer, thermoplastic film bi-axially oriented at a stretching ratio $\geq$ to about 3.0:1 in the machine direction and at a stretching ratio $\geq$ about 6.0:1 in the transverse direction, which film comprises a layer a) comprising at least 50 wt. % of a crystalline or partially crystalline co-polyamide characterized by a $T_g \leq 100°$ C. and at least one outer heat-sealing layer b) comprising a polyolefin, said film being further characterized in that it has a % free shrink at 100° C. $\leq 3$ in each direction.

15 Claims, No Drawings

BIAXIALLY ORIENTED AND HEAT-SET MULTILAYER THERMOPLASTIC FILM FOR PACKAGING

This application is a National Stage filing under 35 U.S.C. §371 of International application No. PCT/EP01/02229, which has an international filing date of Feb. 27, 2001, and said International Application claims the benefit of European patent application Ser. No. 00105242.2 filed on Mar. 13, 2000.

The present invention refers to a highly oriented, heat-set, multilayer thermoplastic film comprising a layer comprising a polyamide, and an outer heat-sealing layer comprising a polyolefin, to a process for the manufacture thereof and to the use of the film as a packaging material.

Multi-layer thermoplastic films are typically employed for the packaging of food and non-food products.

One method for the packaging of products by means of a flexible thermoplastic film provides for the use of pre-made bags or pouches of the suitable size, where the product to be packaged is loaded either manually or automatically. The loaded bags or pouches are optionally vacuumized, and/or gas-flushed and then their open mouth is clipped or sealed.

Another method is by means of a form-fill-seal machine, such as a Horizontal Form-Fill-Seal (HFFS) or a Vertical Form-Fill-Seal (VFFS) machine. A FFS machine, either Horizontal or Vertical, typically includes a former for forming a flat web of flexible film into a tubular configuration, a longitudinal sealer to seal the longitudinal edges of the film in the tubular configuration, either by means of a lap seal or a fin seal, a conveyor for feeding the products into the tubular film one after the other in suitably spaced configuration, or a feeding tube in case of a VFFS machine, and a transverse sealer for sealing the tubular film in a cross-wise direction to separate the products into discrete packages.

A third method involves the use of shaped containers of widely varying configurations and materials, such as trays, closed by flat lids sealed to the containers' flanges.

Because of the commercial use, the nature of the packaging process and the conditions the packages are subjected to during the storage and distribution cycles, films for these types of applications need to have an optimum balance of performance properties, including good mechanical properties, in particular high modulus to provide a satisfactory machinability of the film mainly in high speed packaging processes and at the same time good puncture resistance to guarantee protection of the packaged product from the intrusion of unwanted materials such as dust and dirt, good heat-sealability properties, in particular low temperature heat-sealability combined with strong seal strength particularly when the film is sealed to itself, good optical properties, in particular low haze and high gloss, no shrinkage even at high temperatures, as in some of these application hot products are packaged, and, often, oxygen barrier properties.

The packaging materials currently used for these types of applications are cast coextruded sheets of high thickness containing polyolefin outer layers and as an internal oxygen barrier layer either a polyamide and/or an ethylene-vinyl alcohol layer. In order to achieve the desired mechanical properties, the thickness of these cast coextruded structures is fairly high and sheets of a thickness ranging from at least 60 to about 250 μm are typically employed depending on the specific application. Alternatively, laminates of a biaxially oriented and heat-set resin (such as BO-PET, BO-PP, or BO-PA) glue laminated to a heat-sealing and optionally barrier film are employed. In this latter case the thickness required may be lower as the presence of an oriented layer improves the mechanical properties of the film. Laminates having a thickness of from about 40 to about 100 μm are in fact generally available for these applications. The lamination is however an additional step in the manufacturing process that adds to the cost of the end products so that for economy reasons very often the thicker cast co-extruded structures are preferred.

It has now been found that it is possible to obtain a film that has the desired balance of properties, including good mechanical properties, at a very low thickness with a manufacturing process that does not require any lamination step.

It has been found in fact that it is possible to orient a structure having at least an outer heat-sealing polyolefin layer and a polyamide layer, at very high stretching ratios by suitably selecting the polyamide among the co-polyamides having a $T_g \leq 100°$ C. and that the orientation with such high stretching ratios give to the film remarkable mechanical and oxygen barrier properties.

Orientation is a process whereby a plastic film or sheet is stretched in such a way to orient the polymeric chains of the plastic material in the direction of the force applied. Orientation is known to increase the strength and stiffness of the polymer system, and therefore the tensile properties of the film.

Polyamides are widely employed in the manufacture of oriented films.

They can be employed i.a. as core layers of multi-layer films having a heat-sealable polyolefin layer, because of their gas-barrier properties. It is in fact possible to modulate the gas permeability of the end films by suitably selecting the type of polyamide of the core layer.

In general, oriented films comprising a polyamide layer and an outer heat-sealing polyolefin layer, are obtained by a tubular orientation process. In said process a thick multilayer tube is first extruded through a round die, quenched as rapidly as possible to prevent or slow down crystallization, reheated, e.g. by passing it into a hot water bath and/or an IR or hot air oven, and then stretched in the transverse direction (TD) by introducing into the tube an air pressure that expands the tube diameter to a sort of a bubble and in the machine direction (MD) by running the two sets of nip rolls that contain said bubble at a different speed.

The orientation ratios that can be applied with the tubular orientation processes are however limited and ratios up to about 3.5:1 are typically applied.

Higher stretching ratios could, in line of principle, be employed using flat extrusion and flat stretching. Flat stretching may be done sequentially, i.e. the extruded tape is first stretched in the MD and then in the TD, or simultaneously. In the sequential flat stretching the MD stretching is accomplished by drawing the heated sheet between sets of heated rolls with the downstream set moving at a higher speed and the TD stretching is obtained by means of a tenter frame, a machine that consists of two continuous chains on which are mounted clamps gripping the two edges of the film and carrying it along as the chain is driven forward. In the simultaneous stretching the extruded cast sheet is fed to a pre-heating zone of the simultaneous tenter apparatus, where the film is clipped but not stretched yet, and brought to the temperature desired for bi-axial orientation and then simultaneously stretched in the machine and the transverse direction.

In case of mono-layer structures where the orientation temperature specific for the resin employed, can be applied, stretching ratios for the flat, tenter frame orientation process are up to about 7:1 in MD and up to about 12:1 in TD.

In the patent literature there are described oriented films comprising a polyamide layer and a polyolefin outer layer obtained by tenter frame stretching, that however have been stretched to a limited stretching ratio (<2.2:1 in MD and >4:1 in TD in Japanese kokai 79/15981 (Derwent AN 79-20793B) or 3:1 in MD and 4:1 in TD in Japanese kokai 92/52137 (Derwent AN 92-117943)).

The use of high stretching temperatures, particularly for the transverse stretching, would help to increase the stretching ratios but these high temperatures would not be compatible with the presence of the polyolefin resin of the outer layer.

It has now been found that it is possible to obtain a multi-layer film comprising a layer comprising a polyamide and an outer heat-sealing layer comprising a polyolefin, which film has been oriented at a stretching ratio $\geq$ about 3.0:1 in the machine direction and at a stretching ratio $\geq$ about 6.0:1 in the transverse direction, when the polyamide is a crystalline or partially crystalline co-polyamide with a $T_g \leq 100°$ C.

It has been found that if a heat-setting step follows the bi-axial stretching, the highly oriented multi-layer film, thus obtained, is characterized by the following combination of properties that would render it particularly suitable for the above indicated packaging applications good mechanical properties, in particular a very high puncture resistance, comparable to that of much thicker cast coextruded films still containing polyamides, good heat-sealability, good optical properties, from good to very good oxygen barrier properties depending on the particular copolyamide employed, and no shrinkage at high temperatures ($\leq 3\%$ at 100° C. in each direction).

An object of the present invention is therefore a multi-layer, thermoplastic film oriented at a stretching ratio $\geq$ about 3.0:1 in the machine direction and at a stretching ratio $\geq$ about 6.0:1 in the transverse direction, which film comprises a layer a) comprising at least 50 wt. % of a crystalline or partially crystalline co-polyamide characterized by a $T_g \leq 100°$ C., and at least one outer heat-sealing layer b) comprising a polyolefin, said film being further characterized in that it has a % free shrink at 100° C. $\leq 3$ in each direction.

Another object of the present invention is a process for the manufacture of such a film which process comprises stretching an extruded tape comprising a layer a) comprising at least 50 wt. % of a crystalline or partially crystalline co-polyamide characterized by a $T_g \leq 100°$ C., and at least one outer heat-sealing layer b) comprising a polyolefin, in the machine direction with a stretching ratio of $\geq 3.0:1$ and in the transverse direction with a stretching ratio of $\geq 6.0:1$, either sequentially or simultaneously, at suitably selected orientation temperatures and then heat-setting the film at a temperature from about 15° C. below the orientation temperature to the orientation temperature applied or even higher.

DEFINITIONS

As used herein, the term "film" is used in a generic sense to include a plastic flexible web, regardless of whether it is a film or a sheet. Preferably, films of use in the present invention have a thickness of 100 μm or less, more preferably they have a thickness of from about 10 to about 90 μm, and even more preferably of from about 12 to about 80 μm.

The term "oriented" designates a structure which has been stretched at a temperature—indicated as the "orientation temperature"—higher than the $T_g$ of each of the resins making up the structure and lower than the m.p. of at least one of said resins. As used herein the term "oriented" designates bi-axially oriented materials, i.e. materials wherein the stretching is carried out in two perpendicular directions, i.e. the machine or longitudinal direction (MD) as well as the transverse direction (TD).

As used herein, the term "homo-polymer" is used with reference to a polymer resulting from the polymerization of a single monomer, i.e., a polymer consisting essentially of a single type of repeating unit.

As used herein, the term "co-polymer" refers to polymers formed by the polymerization reaction of at least two different monomers.

As used herein, the term "polymer" refers to both homo-polymers and co-polymers as defined above.

In particular the term "polyamide", as used herein, refers to both polyamide homo-polymers and polyamide co-polymers, also called co-polyamides.

As used herein the term "co-polyamide" on the other hand identifies the polyamide product built from at least two different starting materials, i.e. lactams, aminocarboxylic acids, equimolar amounts of diamines and dicarboxylic acids, in any proportion; this term therefore also encompasses ter-polyamides and, in general, multi-polyamides.

As used herein, the term "polyolefin" refers to any polymerised olefin, which can be linear, branched, cyclic, aromatic, substituted, or unsubstituted. More specifically, included in the term polyolefin are homo-polymers of olefin, co-polymers of olefin, co-polymers of an olefin and a non-olefinic comonomer copolymerizable with the olefin, such as vinyl monomers, modified polymers thereof, and the like. Specific examples include ethylene homo-polymers, ethylene-α-olefin copolymers and terpolymers, propylene homo-polymers, propylene-α-olefin copolymers and ter-polymers, butene homo-polymers, butene-α-olefin copolymers, ethylene-vinyl acetate copolymers, ethylene-ethyl acrylate copolymers, ethylene-butyl acrylate copolymers, ethylene-methyl acrylate copolymers, ionomer resins, and modified polyolefins.

As used herein the term "ethylene homo-polymers", "propylene homo-polymers", or "butene homo-polymers" identify polymers consisting essentially of an ethylene, propylene or butene repeating unit respectively.

As used herein, the phrase "ethylene a-olefin co-polymer" as well as the phrase "ethylene α-olefin ter-polymer" refers to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as for instance EXACT™ materials supplied by Exxon, AFFINITY™ and ENGAGE™ materials supplied by Dow, LUFLEXEN™ materials supplied by BASF and TAFMER™ materials supplied by Mitsui Petrochemical Corporation. These materials generally include co-polymers of ethylene with one or more co-monomers selected from $C_4$ to $C_{10}$ α-olefins such as butene-1 (i.e., 1-butene), hexene-1, octene-1, etc.

As used herein, the phrase "modified polyolefin", as well as more specific phrases such as "modified ethylene vinyl acetate co-polymer", or "modified ethylene-α-olefin co-polymer" refer to such polymers having an acid or, preferably, an anhydride functionality, such as maleic or fumaric acid, or anhydride, grafted thereon and/or co-polymerized therewith and/or blended therewith. Preferably, such modified polymers have the anhydride functionality grafted on or polymerized therewith, as opposed to merely blended therewith.

As used herein, the phrase "directly adhered", as applied to film layers, is defined as adhesion of the subject film layer to the object film layer, without a tie layer, adhesive, or other layer there-between. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be imposed between the subject layer and one or more of the layers the subject layer is between.

As used herein, the phrases "inner layer" and "internal layer" refer to any film layer having both of its principal surfaces directly adhered to another layer of the film.

As used herein, the phrase "outer layer" refers to any film layer having only one of its principal surfaces directly adhered to another layer of the film.

As used herein, the term "core", and the phrase "core layer" refer to any internal film layer that has a primary function other than serving as an adhesive or compatibilizer for adhering two layers to one another.

The term "barrier" as used herein means a layer of a multilayer film that comprises a material which acts as a physical barrier to gaseous oxygen molecules. Typically the presence of the polyamide barrier layer in the film of the present invention will reduce the oxygen permeability of the film to less than 700 $cm^3/m^2 \cdot day \cdot bar$, at 23° C. and 0% relative humidity. The oxygen permeability value is obtained in accordance with ASTM D3985-81.

Additional "barrier layers" may be present, such as layers comprising PVDC, ethylene-vinyl alcohol co-polymers, polyamides, blends of ethylene-vinyl alcohol co-polymers and polyamides, etc.

As used herein, the term "PVDC" refers to a vinylidene chloride copolymer wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) or to a blend thereof in different proportions. Generally said PVDC contains plasticizers and/or stabilizers as known in the art.

As used herein, the phrase "bulk layer" refers to any layer that is present for the purpose of improving the abuse-resistance, toughness, modulus, etc., of the film. Bulk layers generally comprise polymers which are inexpensive relative to other polymers in the film which provide some specific purpose unrelated to abuse-resistance, modulus, etc.

As used herein, the phrase "tie layer" refers to any internal layer having the primary purpose of adhering two layers to one another.

As used herein the sentence "crystalline or at least partially crystalline co-polyamide" is used to distinguish the co-polyamide referred to from the amorphous ones, wherein the amorphous polyamides are characterized by no measurable melting point (and correspondingly by a heat of fusion less than 2.1 J/g), when measured by DSC according to ASTM 3417.

As used herein the term "polyester" is intended to refer to any thermoplastic film-forming, polyester and co-polyester comprising alkylene terephthalate or alkylene naphthalenate as the main recurring units in the polymer chain.

Polyesters comprising alkylene terephthalate as the main recurring units in the polymer chain are however preferred. These polyesters are produced mainly by the polycondensation of terephthalic acid or an ester-forming derivative thereof with an alkylene dihydroxyl compound. Examples of the alkylene dihydroxyl compounds include ethylene glycol, propylene glycol, butanediol, neopentyl glycol and the ester-forming derivatives thereof.

The copolyesters will comprise these polyalkylene terephthalate groups as the main constituent units and 30% molar or less, preferably 20% molar or less of another comonomer. Examples of the comonomers that can be used are dicarboxylic acids such as isophthalic, naphthalendicarboxylic, cyclohexanedicarboxylic, adipic, and sebacic acids as well as the substituted derivatives thereof. These dicarboxylic acids can be used in the form of ester-forming derivatives such as lower alcohol esters. Examples of the dihydroxyl compounds for forming the copolyesters include one or more of hydroquinone, dihydroxyphenyl, cyclohexanediol, polyoxyalkylene glycols and the substituted derivatives thereof.

DETAILED DESCRIPTION OF THE INVENTION

A first object of the present invention is a multi-layer, thermoplastic film oriented at a stretching ratio ≧ about 3.0:1 in the machine direction and at a stretching ratio ≧ about 6.0:1 in the transverse direction, which film comprises a layer a) comprising at least 50 wt. % of a crystalline or partially crystalline co-polyamide characterized by a $T_g \leq 100°$ C., and at least one outer heat-sealing layer b) comprising a polyolefin, said film being further characterized in that it has a % free shrink at 100° C.≦3 in each direction.

In a preferred embodiment of the present invention, the film is oriented at a stretching ratio ≧ about 3.5:1, more preferably ≧ about 3.8:1, and even more preferably ≧ about 4.0:1, in the machine direction and at a stretching ratio ≧ about 6.2:1, and more preferably ≧ about 6.5:1, in the transverse direction.

Examples of crystalline or partially crystalline co-polyamides characterized by a $T_g \leq 100°$ C. that can suitably be employed in layer a), are certain polyamide aliphatic co-polymers obtained by co-polymerization of ε-caprolactam and ω-laurolactam (polyamides 6/12 such as Grilon™ CF6S commercially available from EMS), certain aliphatic co-polymers obtained by co-polymerization of ε-caprolactam, hexamethylenediamine and azelaic acid (polyamides 6/69 such as Grilon™ CF62BS commercially available from EMS), polyamide co-polymers obtained from meta-xylylendiamine, adipic acid and isophthalic acid (MDX6/MDXI such as Grilon™ FE 4581 commercially available from EMS), some multi-polyamides obtained from hexamethylenediamine, meta-xylylendiamine, adipic acid, and sebacic acid (such as Grilon™ XE3569 commercially available from EMS).

The co-polyamides of layer a) can be used alone or admixed with any other resin compatible therewith provided they would not impair the orientability of the overall structure, such as less than about 50 wt. %, preferably less than about 40 wt. %, and even more preferably less than about 30 wt. % of amorphous polyamides, ethylene-vinyl alcohol co-polymers, polyesters, co-polyesters, or even crystalline or partially crystalline polyamides having a $T_g$>100° C., etc.

The thickness of the co-polyamide comprising layer a) is typically of from about 1.5 to about 25 µm. Layers thinner than 1.5 µm would not provide the film with the desired mechanical and barrier properties, while layers thicker than 25 µm would increase the cost of the film unnecessarily as the advantages brought by a further increase in the wt. % amount of co-polyamide in the overall film would not be dramatic. Preferably the thickness of the co-polyamide comprising layer a) is of from about 2.5 to about 15 µm, and more preferably of from about 3.0 to about 10 µm.

In the films according to the present invention the outer heat-sealing layer b) may comprise a single polymer or a blend of two or more polymers as known in the art. Preferably the melting point of the polyolefin resin(s) of the outer heat-sealing layer b) will be <150° C., and preferably <140° C. In a more preferred embodiment it will be comprised between about 80° C. and about 135° C. and in an even more preferred embodiment it will be comprised between about 90° C. and about 128° C.

Such a layer may for example comprise one or more heterogeneous or homogeneous ethylene-($C_4$–$C_8$)-α-olefin co-polymers having a density $\leq$0.925 g/cm³; blends thereof with minor amount of polyethylene honio-polymers or heterogeneous or homogeneous ethylene-($C_4$–$C_8$)-α-olefin co-polymers having a density >0.925 g/cm³; ethylene-vinyl acetate co-polymers; ethylene-acrylic or methacrylic acid co-polymers including ionomers; blends of heterogeneous or homogeneous ethylene-($C_4$–$C_8$)-α-olefin co-polymers having a density from about 0.915 g/cm³ to about 0.935 g/cm³ with ethylene-vinyl acetate co-polymers or ethylene-alkyl (meth)acrylate co-polymers; ethylene-propylene-co-polymers; ethylene-propylene-butene ter-polymers; ethylene-alkyl acrylate-maleic anhydride ter-polymers; and the like polymers.

In a preferred embodiment of the present invention the heat-sealing layer b) will comprise a heterogeneous or homogeneous ethylene-($C_4$–$C_8$)-α-olefin co-polymer having a density $\leq$0.925 g/cm³, and even more preferably a heterogeneous or homogeneous ethylene-($C_4$–$C_8$)-α-olefin co-polymer having a density comprised between about 0.900 g/cm³ and about 0.922 g/cm³. The Melt Index of said heterogeneous or homogeneous ethylene-($C_4$–$C_8$)-α-olefin co-polymer may range from about 0.1 to about 15 g/10' (measured by ASTM D-1238, Condition E). However, preferred values are in the range 0.5–10 g/10' and still more preferred values are in the range 1.0–7.0 g/10'.

The thickness of the outer heat-sealing b) is generally higher than 2 µm, and preferably higher than 3 µm.

In certain cases, depending on the polyolefin used for the outer heat-sealing layer b), it may be necessary or advisable to position a tie layer c) between the layer comprising the co-polyamide and the outer heat-sealing polyolefin one, in order to get a sufficient bond between the film layers. Preferred resins for such a tie layer will be e.g. modified ethylene-at-olefin co-polymers or modified co-polymers of ethylene and an ethylenically unsaturated ester, typically modified ethylene-vinyl acetate co-polymers.

In a preferred embodiment of the present invention the co-polyamide layer a) is an internal layer and the film has an additional outer layer d).

Said second outer layer d) may comprise one or more polyolefins, modified polyolefins, polyamides, and polyesters.

The thickness of said outer layer d) is not a critical feature and the optimized value will depend on the overall thickness of the structure, the type of resin employed therefor, and the function said outer layer d) would serve. Typically said outer layer d) will have a thickness comprised between about 1 and about 30 µm.

In a preferred embodiment of the invention said outer layer d) will comprise a polyolefin.

Preferably, but not necessarily, in such a case the composition of the outer layer d) will be the same of the outer heat-sealing layer b), so as to provide for a symmetrical structure.

The use of a symmetrical structure is highly preferred when thin films (from about 10 to about 40 µm) are desired to be employed in high-speed HFFS (Horizontal-Form-Fill-Seal) machines. A symmetrical structure does not give any curl and if the modulus is sufficiently high has a good machinability. Furthermore, a symmetrical structure can also be lap-sealed, if desired, still giving strong seals.

In some cases however, for instance when the film has to be used in the manufacture of pouches that need to be easily openable, the composition of the second outer layer d) may be different from that of the layer b) and for example it may comprise a so-called "peelable" blend as known in the art. In such a case it would in fact be possible to manufacture a pouch, such as by means of a HFFS or VFFS machine, wherein the transverse fin seals will be very strong seals and the longitudinal lap seal will be a peelable one. This will provide for the integrity of the package during conventional storage and handling conditions and easy openability, when desired, by a peeling mechanism.

Alternatively, when an easy opening pouch is desired, the outer layer d) may comprise a blend of at least two thermoplastic polymers known to provide for the cohesive failure of the layer and the pouch will comprise transverse fin seals and a longitudinal easy openable lap seal. Examples of blend of polymers exhibiting cohesive failure are for instance those blends of an ethylene terpolymer with an ionomer described in U.S. Pat. No. 4,469,754; or of an ethylene polymer and a propylene polymer described in U.S. Pat. No. 5,160,767; or those ternary blends of copolymers of acrylic acid or methacrylic acid, modified ethylene vinyl acetate, and polybutylene described in International patent application PCT/EP99/02411; and the like blends.

Or, still alternatively, when an easy opening pouch is desired, the outer layer d) may have the same composition of the heat-sealing layer b) but its thickness be less than 10 µm and an intermediate layer e), containing a cohesive failure blend be directly adhered thereto.

When the film of the present invention is employed in the manufacture of bags or pouches, e.g. by folding the flat film and transverse sealing it, a thicker structure (from about 20 to about 80 µm) will be preferred and the outer layer d) will be suitably selected, independently from the outer heat-sealing layer b), with the aim at providing the bag with a high abuse resistance. In such a case preferred resins for said outer layer d) would be polyamides, polyesters, and some polyolefins, such as the heterogeneous or homogeneous ethylene-($C_4$–$C_8$)-α-olefin co-polymers having a density from about 0.915 g/cm³ to about 0.935 g/cm³ possibly blended with polyethylene homo-polymers, ethylene-vinyl acetate co-polymers or ethylene-alkyl (meth)acrylate co-polymers; and ethylene-propylene co-polymers.

The use of polyamides and polyesters in the outer layer d) is advantageous also for other reasons including printability of the film, stack sealability of the bags/pouches made therewith, resistance to UV radiations, and the like.

Also between the co-polyamide layer a) and the outer layer d) it may be necessary or advisable to position a tie layer c'). Tie layer c') is defined as tie layer c) above, but it can be equal or different from c).

In a most preferred embodiment of the present invention, the film will therefore comprise at least 5 layers with tie layers c) and c') positioned between the internal co-polyamide layer a) and the outer layers b) and d).

Additional layers may be present in the overall structure to improve the characteristics thereof.

The thermoplastic resins which are employed in these optional, additional, layers need however to be highly orientable at temperatures compatible with the rest of the structure and with the mechanical properties desired for the end film.

Suitable resins are, for example, polyolefins, and in particular heterogeneous ethylene-α-olefin co-polymers, homogeneous ethylene-α-olefin co-polymers, ethylene-vinyl acetate co-polymers, ethylene-(meth)acrylic acid co-polymers, ethylene-alkyl(meth)acrylate co-polymers, ionomers, propylene polymers, modified polyolefins, and blends thereof. These resins can be used for instance in internal layers to provide the required bulk.

PVDC also is a suitable resin that can be employed in a core layer when high barrier properties (oxygen permeability lower than 50 $cm^3/m^2.day.bar$, at 23° C. and 0% or 100% relative humidity) are required.

The resins used in the manufacture of the films according to the present invention can be suitably additivated as known in the art in order to improve the properties of the film or to ease the manufacture thereof.

As an example the resins may contain stabilizers, anti oxidants, pigments, UV absorbers, cross-linking enhancers or cross-linking inhibitors, anti-fog agents or compositions, slip and anti-blocking agents, etc., as conventionally used in this field.

In particular the outer layers may comprise slip and anti-blocking agents as conventionally used in this field, such as silica, either natural or synthetic silica, calcium stearate, amides or bis-amides, etc. They may also contain small amounts of fluorinated hydrocarbon resins to improve processability and in particular improve extrudability and resin distribution through the flat extrusion die.

The thickness ratio between the different layers in the final film is not critical and depends on the overall thickness desired for the end film, on the number of layers in the structure and on the OTR desired for the structure.

The film according to the present invention is manufactured by extrusion of a thick primary tape that is then stretched, either sequentially or simultaneously, using a tenter frame.

The primary tape can be obtained by any known extrusion technique and, if a round die is employed, by opening of the tubular tape to give the sheet to be flat stretched.

However, while hot blown as well as cast extrusion through a round die can be employed, preferably the primary tape is extruded through a flat die.

Preferably the tape is co-extruded but the technique of extrusion coating for the preparation of said primary tape is however possible.

Thus in a preferred embodiment the flat multi-layer tape is extruded onto a cooled roll and quenched as known in the art. Then it is re-heated and stretched in the machine direction and in the transverse direction.

As indicated above the orientation in the machine direction and that in the transverse direction can be carried out separately, wherein, preferably, that in the machine direction is carried out first.

To stretch in the machine direction, the tape is passed through at least two sets of heated rolls revolving at different speed, with the downstream set moving at a higher speed. The temperature at which stretching in the machine direction is carried out typically ranges from about 85° C. to about 140° C. The pre-heating temperature (i.e. the temperature of the heated rolls through which the tape is passed before the stretching step starts) and the relaxation temperature (i.e. the temperature of the heated rolls through which the tape is passed after the stretching step in machine direction is complete) are generally 10 to 20° C. higher.

The stretching ratio in the machine direction is at least 3.0:1 but higher stretching ratios, up to 5.0:1, 6.0:1 or 7.0:1, can be applied.

The stretching in the transverse direction is carried out by means of a tenter frame oven that comprises a certain number of heating zones and suitable stretching means.

The stretching temperature is typically comprised between about 120 and about 150° C., with a pre-heating temperature of 5 to 15° C. higher.

The stretching ratio in the transverse direction is at least 6.0:1 but higher stretching ratios, e.g. up to 8.0:1, 9.0:1 or even more, might possibly be applied.

The transversal orientation is then followed by a heat-setting step that is carried out by subjecting the film, while still clipped but no longer stretched, to a temperature comparable to that used for the transversal stretching. Preferably the stretching rails in the end section of the tenter frame are not kept parallel but are allowed to slightly converge.

Alternatively the stretching can be carried out simultaneously in both perpendicular directions. This simultaneous stretching is preferably obtained by a system where the clips are propelled throughout the opposed loops of the tenter frame by means of a linear synchronous motor. A suitable line for simultaneous stretching with linear motor technology has been designed by Brueckner GmbH and advertised as LISIM® line.

In the simultaneous stretching the orientation temperature is typically comprised between about 120 and about 150° C., with a pre-heating temperature of 5 to 15° C. higher and a heat-setting temperature close to the orientation one.

The film of the present invention may be partially or wholly cross-linked. To produce cross-linking an extrudate is treated with a suitable radiation dosage of high-energy electrons, preferably using an electron accelerator, with the dosage level being determined by standard dosimetry methods. Other accelerators such as a Van der Graaf generator or resonating transformer may be used. The radiation is not limited to electrons from an accelerator since any ionizing radiation may be used. Radiation dosages are referred to herein in terms of kGreys. A suitable radiation dosage of high energy electrons is up to about 140 kGreys, typically in the range of from about 10 to about 120 kGreys, preferably it is in the range of from about 20 to about 100 and even more preferably in the range of from about 30 to about 80 kGreys.

Irradiation is most preferably performed prior to orientation but it could also be performed during and/or after orientation.

The film may also be printed. In the simplest cases just black letters with the product identification and the instructions for correct product storage or use, or in the most complex cases designs made with various colors, advertising the product and the producer. To improve print adhesion, the film of the present invention may be primed using a coating of a resin that improves adhesion, gloss or durability of the following print, or alternatively the surface of the film which will be printed, can be rendered more receptive to ink by subjecting it to a corona discharge treatment or to any other treatment that is known to increase surface energy, such as flame treatment.

The invention will now be described with reference to the following examples that are intended to be illustrative of some preferred embodiments of thermoplastic films.

Said examples should not be interpreted as a limitation to the scope of the present invention.

Melt Flow Indexes (MFI's), unless otherwise indicated, are measured by ASTM D-1238, Condition E, 190° C./2.16 kg, and are anyway reported in grams/10 minutes.

The densities have been measured by ASTM D 792.

Unless otherwise specifically indicated, all percentages are by weight.

Melting points, if not otherwise indicated, have been determined by DSC following ASTM D-3418 ($2^{nd}$ heating—10° C./min).

Glass transition points have also been determined by DSC following ASTM D-3418.

EXAMPLE 1

A 5-layer film having the following structure:
A/B/C/B/A, wherein

A is a blend of 49% of linear low density polyethylene with d=0.920 g/cm$^3$, and MFI=1 g/10' (Dowlex™ 2045E commercially available from Dow), 24% of ethylene-vinyl acetate co-polymer with 4.5% VA, MFI=2.0 g/10' (Escorene™ LD362BW commercially available from Exxon), 24% of linear medium density polyethylene with d=0.935 g/cm$^3$, and MFI=2.6 g/10' (Dowlex™ SC 2102.00 commercially available from Dow), comprising about 0.1% of silica and about 0.3% of erucamide, and 3% of a masterbatch based on LDPE containing fluorinated hydrocarbon resins as processing aids (Sarmawax™ LLT commercially available from Clariant);

B is a modified very low density linear polyethylene (Admer™ AT1094E commercially available from Mitsui); and C is a multi-polyamide obtained from the following monomers hexamethylenediamine, meta-xylylenediamine, adipic acid and sebacic acid characterized by a glass transition point of 57° C. and a melting point of 181° C. (Grilon™ XE3569 commercially available from EMS), and the thickness of the various layers is respectively 12/4/3.5/4/12 μm, is prepared by co-extrusion through a flat die at a die temperature of about 230° C.

The tape, 920 μm thick and 575 mm wide, is cooled by means of a chill roll kept at 20° C. The linear speed of the quenched tape is 20 m/min. The tape is cross-linked to 60 kGreys and then pre-heated to a temperature of about 110° C. on oil heated rolls and stretched in machine direction at a temperature of about 90° C. with a stretching ratio of about 4.0:1. The MD oriented tape is passed through another set of rolls heated to a temperature of about 110° C. for relaxation, and then transferred to a tenter frame oven having four heating zones in which the temperature (pre-heating temperature) is about 135° C. Stretching, to a TD stretching ratio of about 6.5:1, is then carried out at a temperature of about 125° C., and finally heat-setting is carried out at a temperature of from about 125° C. to about 130° C.

Finally the film is cooled and wound onto a roll. The obtained biaxially oriented film has a final thickness of about 35 μm.

EXAMPLE 2

A 5-layer film having the following structure:
A/B/C'/B/A, wherein A and B are as in Example 1 and C' is an MXD6/MXDI co-polyamide characterized by a glass transition point of 96° C. and a melting point of 213° C. (Grilon™ FE4581 commercially available from EMS), is prepared by following essentially the same procedure as in the foregoing example.

The thickness of the various layers is respectively 7.5/3.5/3.0/3.5/7.5 μm for a total thickness of 25 μm.

EXAMPLE 3

A 5-layer film having the following structure:
A/B/C''/B/A, wherein A and B are as in Example 1 and C'' is a blend of 60% by weight of a co-polyamide 6/12 characterized by a glass transition point of 25° C. and a melting point of 130° C. (Grilon™ CF6S commercially available from EMS), and 40% by weight of ethylene-vinyl alcohol copolymer with 44% by mole of ethylene (EVAL EP-E151B commercially available from Kuraray), is prepared by following essentially the same procedure as in example 1.

EXAMPLE 4

A 5-layer film having the following structure:
A'/B/C'/B/A', wherein

A is a blend of 87.5% of an ethylene-propylene-butene terpolymer with d=0.899 g/cm$^3$, and MFI=5.5 g/10' (ASTM D-1238 at 230° C. and 2.16 kg) (Adsyl™ 5C 37F commercially available from Montell), and 12.5% of polypropylene homopolymer with d=0.904 g/cm$^3$, and MFI=3.0 g/10' (ASTM D-1238 at 230° C. and 2.16 kg) (Profax™ PD064 commercially available from Montell), comprising about 0.1% of silica and about 0.3% of erucamide;

B is as in Example 1 and C' is as in Example 2 and the thickness of the various layers is respectively 10/4/3.5/4/10 μm, is prepared by co-extrusion through a flat die at a die temperature of about 230° C. and simultaneous stretching (MD 4.0:1, TD 7.0:1).

The temperature in the preheating zone is kept between about 130° C. and about 140° C. and the orientation temperature is comprised between about 120° C. and about 130° C. Heat-setting is carried out at a temperature of about 130° C.

EXAMPLE 5

A 5-layer film having the following structure:

A''/B/A''/B/C''' wherein A'' is a linear low density polyethylene with d=0.920 g/cm$^3$ (Dowlex™ 2045E commercially available from Dow), B is as in Example 1, and C''' is an MXD6/MXDI co-polyamide characterized by a glass transition temperature of 96° C. and a melting temperature of 213° C., additivated with magnesium stearate, (Grilon™ FE5299 commercially available from EMS), and the thickness of the various layers is respectively 5/3/12/3/12 µm, is prepared by co-extrusion through a flat die equipped with a deckling system, at a die temperature of about 230° C., irradiation of the obtained tape at about 100 kGy, followed by simultaneous stretching (with stretching ratio in the machine direction of 4.0:1 and stretching ratio in the transverse direction of 7.0:1) at an orientation temperature comprised between 120 and 130° C. (pre-heating at 130–140° C.) and finally by heat-setting at about 130° C.

EXAMPLE 6

A 5-layer film having the following structure

A'''/B/A'''/B/C''' wherein A''' is an ethylene-propylene copolymer (Moplen™ EP2C30F commercially available from Montell), B is as in Example 1, and C''' is as in Example 5, and the thickness of the various layers is respectively 4/3/10/3/10 µm, is prepared by co-extrusion through a flat die equipped with a deckling system, at a die temperature of about 250° C., irradiation of the obtained tape at about 75 kGy, followed by simultaneous stretching (with stretching ratio in the machine direction of 4.0:1 and stretching ratio in the transverse direction of 6.0:1) at an orientation temperature comprised between 130 and 140° C. (pre-heating at 140–150° C.) and finally by heat-setting at about 150° C.

EXAMPLE 7

A 7-layer film having the following structure:

A''/B'/A'''/B'/C'''/B'/D wherein A'' and C''' are as in Example 5, A''' is as in Example 6, B' is a rubber modified ethylene-α-olefin copolymer grafted with maleic anhydride (Admer™ 1335 E commercially available from Mitsui), and D is a polypropylene homopolymer with d=0.905 g/cm$^3$ and MFI of 3.0 g/10 min (at 230° C. and 2.16 kg) (Polypropylene KF6100 commercially available from Montell), and the thickness of the various layers is respectively 10/5/15/5/5/5/10 µm, is prepared by co-extrusion through a flat die, at a die temperature of about 250° C., irradiation of the obtained tape at about 100 kGy, followed by stretching in the machine direction at a stretching temperature of about 90° C. (pre-heating at about 95° C.) and with a stretching ratio of 5.0:1 and in the transverse direction at a stretching temperature of about 140° C. (pre-heating at about 150° C.) and with a stretching ratio of 7.0:1, finally followed by heat-setting at about 140° C.

EXAMPLE 8

A 7-layer film having the following structure:

A'''/B'/A'''/B'/C'''/B'/D' wherein A'' and C''' are as in Example 5, A''' is as in Example 6, B' is as in Example 7, and D' is a co-polyester based on polyethyleneterephtahalate units and containing 1,4-cyclohexanediol co-monomers (PET$_g$-Eastman 6763 commercially available from Eastman Chemicals), and the thickness of the various layers is respectively 10/5/15/5/5/5/10 µm, is prepared by co-extrusion through a flat die, at a die temperature of about 250° C., irradiation of the obtained tape at about 100 kGy, followed by stretching in the machine direction at a stretching temperature of about 85° C. (pre-heating at about 90° C.) and with a stretching ratio of 4.0:1 and in the transverse direction at a stretching temperature of about 135° C. (pre-heating at about 145° C.) and with a stretching ratio of 6.5:1, finally followed by heat-setting at about 140° C.

The properties of representative films of the present invention have been evaluated by submitting the films to the tests indicated below.

% Free shrink: the percent free shrink, i.e. the irreversible and rapid reduction, as a percent, of the original dimensions of a sample subjected to a given temperature under conditions where nil restraint to inhibit shrinkage is present, has been measured according to ASTM D2732, by immersing for 4 seconds specimens of the structures to be tested (10 cm×10 cm) into a bath of hot oil at 100° C. This attribute has been measured in the machine or longitudinal direction (MD) as well as in the transversal direction (TD) and is reported as the sum thereof, i.e. the total free shrink.

Oxygen Transmission rate (OTR): OTR is evaluated, at 23° C. and 0% R.H., according to ASTM D-3985 using an OX-TRAN instrument by Mocon and is expressed as cm$^3$/m$^2$.day.bar.

Haze: haze is defined as that percentage of transmitted light which in passing through the specimen deviates from the incident beam by forward scattering, and it has been measured by ASTM D 1003 (Procedure A).

Gloss: the specular gloss of the films, i.e. the relative luminous reflectance factor of a specimen in the mirror direction has been measured using ASTM 2457-90 with a gloss angle of 60°.

Modulus: the ratio of the tensile stress to corresponding strain below the proportional limit (kg/cm$^2$); measured by ASTM D 882.

Tensile: a measure of the force required at constant elongation to break a specimen of the film (kg/cm$^2$); measured by ASTM D 882.

Elongation: a measure of the percent extension required to break a specimen of the film (%); measured by ASTM D 882.

Thickness variation %: is the percent value obtained by measuring the maximum and minimum thickness of the film, calculating the average thickness value and applying these numbers to the following formula:

$$\text{Thickness variation (\%)} = \frac{\text{film thickness}_{(max)} - \text{film thickness}_{(min)}}{\text{film thickness}_{(avg)}} \times 100.$$

The maximum and minimum thicknesses are determined by taking a total of 10 thickness measurements at regular distance intervals along the entirety of the transverse direction of a film sample, recording the highest and lowest thickness values as the maximum and minimum thickness values, respectively, while the average value is determined by summing up the same 10 thickness measurements and dividing the result by ten. The thickness variation is then computed (as a percent value) using the formula above. A thickness variation of 0% represents a film with no measurable differences in thickness. A thickness variation over 20% is unacceptable industrially while a thickness variation below 10% is a good value.

Puncture resistance: the puncture resistance is the resistance force arising when pushing a punch against a surface of flexible film. There is not a standard test method to measure this attribute. The test method used in the present evaluations is described briefly herein below: a film sample (6.5 cm×6.5 cm) is fixed in a specimen holder connected to a compression cell (1–50 kg normal sensitivity) mounted on a dynamometer (an Instron tensile tester); when the dynamometer is started, a punch (a punching sphere, 5-mm in diameter, soldered on a plunger) is brought against the film sample at a constant speed (30 cm/min.) and the force needed to puncture the sample is graphically recorded.

The % Shrink, OTR, Haze, Gloss, Modulus, Tensile, Elongation, and % Thickness Variation of some representative structures of the present invention are reported in Table 1 below

TABLE 1

| Structure of Example no. | 1 | 2 |
|---|---|---|
| % Shrink at 100° C. | | |
| MD | 1 | 2 |
| TD | 2 | 3 |
| OTR | — | 86 |
| Haze | 4 | 2.5 |
| Gloss | 110 | 128 |
| Modulus | | |
| MD | 5850 | 5930 |
| TD | 5120 | 5240 |
| Tensile | | |
| MD | 430 | 470 |
| TD | 660 | 740 |
| Elongation | | |
| MD | 220 | 280 |
| TD | 120 | 130 |
| % Thickness variation | 3 | 2 |

The results of the Puncture resistance test for a representative film of the present invention is reported in Table 2 below. More particularly a comparison has been made between the film of Example 2 of the present invention, having a thickness of 25 μm, and a cast coextruded commercial structure currently used as tray lidding, 65 μm thick, containing about 25 wt. % polyamide and about 40 wt. % of propylene based polymers (Comparative Example A) and another cast co-extruded commercial structure used for liquid packaging with VFFS machines, 130 μm thick, containing about 25 wt. % of polyamide and 12 wt. % of ethylene-vinyl alcohol (Comparative Example B).

TABLE 2

| | Example 2 | Comp. Ex. A | Comp. Ex. B |
|---|---|---|---|
| Puncture (g) 30° C. | 3,000 | 1,400 | 3,100 |

The film of Example 2 of the present invention has been tested for use as the lidding film in a standard thermoforming Tiromat Powerpack machine under the following packaging conditions: sealing temperature: 120° C. and sealing time 2 s, showing good sealability and good machinability.

The same film has been tested also on a VFFS machine for liquid packaging (Onpack® 2050, a machine manufactured by Orihiro) under the following packaging conditions: sealing temperature 140–150° C., sealing time 0.8–1 s, machine speed 20/30 ppm, with good results as for sealability and machinability.

Finally the film of Example 2 has been evaluated also on a Hayssen 1800 RT machine at 90 ppm without any problem.

The invention claimed is:

1. A multi-layer, thermoplastic film, bi-axially oriented at a stretching ratio greater than or equal to 3.0:1 in the machine direction and at a stretching ratio greater than or equal to 6.0:1 in the transverse direction, which film comprises
    a) a layer comprising at least 50 wt.% of a crystalline or partially crystalline co-polyamide characterized by a $T_g$ less than or equal to 100° C., and
    b) an outer heat-sealing layer comprising a polyolefin in, said film being further characterized in that it has a % free shrink at 100° C. less than or equal to 3 in each of the machine and transverse directions.

2. The film of claim 1 wherein the film is bi-axially oriented at a stretching ratio greater than or equal to 3.5:1 in the machine direction and at a stretch-ing ratio greater than or equal to 6.2:1 in the transverse direction.

3. The film of claim 1 wherein the crystalline or partially crys-talline co-polyamide characterized by a $T_g$ less than or equal to 100° C. of layer a) is selected from the group consisting of
    a) aliphatic co-polymer obtained by co-polymerization of ε-caprolactam and ω-laurolactam,
    b) aliphatic co-polymer obtained by co-polymerization of ε-caprolactam, hexamethylenediamine and azelaic acid,
    c) polyamide co-polymer obtained from meta-xylylendiamine, adipic acid and isophthalic acid and
    d) polyamide co-polymer obtained from hexamethylenediamine, metaxylylendiamine, adipic acid, and sebacic acid.

4. The film of claim 1 wherein the co-polyamide of layer a) is used alone or in admixture with less than about 50 wt.% of another resin selected from the group consisting of
    a) crystalline or partially crystalline polyamide having a $T_g$ greater than 100° C.,
    b) amorphous polyamide,
    c) ethylene-vinyl alcohol copolymer,
    d) polyester and
    e) co-polyester.

5. The film of claim 1 wherein the polyolefin in of the outer heat-sealing layer b) has a melting point less than 150 C.

6. The film of claim 5 wherein the polyolefin in of the outer heat-sealing layer b) has a melting point of from 80° C. to 135° C.

7. The film of claim 1 wherein the outer heat-sealing layer b) comprises one or more polymers selected from the group consisting of
    a) heterogeneous or homogeneous ethylene-($C_4$–$C_8$)-α-olefin copolymer having a density less than or equal to 0.925 g/cm$^3$;
    b) a blend of
        i) a heterogeneous or homogeneous ethylene-($C_4$–$C_8$)-α-olefin co-polymer having a density less than or equal to 0.925 g/cm$^3$ with
        ii) a minor amount of polyethylene homopolymer or heterogeneous or homogeneous ethylene-($C_4$–$C_8$)-α-olefin copolymer having a density greater than 0.925 g/cm$^3$;
    c) ethylene-vinyl acetate copolymer;
    d) ethylene-acrylic or methacrylic acid copolymer;

e) ionomer resin;
f) a blend of
- i) heterogeneous or homogeneous ethylene-($C_4$–$C_8$)-α-olefin co-polymer having a density from 0.915 g/cm³ to 0.935 g/cm³ with
- ii) ethylene-vinyl acetate copolymer or ethylene-alkyl (meth)acrylate copolymer;

g) ethylene-propylene-co-polymer;
h) ethylene-propylene-butene ter-polymer; and
i) ethylene-alkyl acrylate-maleic anhydride ter-polymer.

8. The film of claim 1 wherein a tie layer c) is positioned be-tween the layer a) comprising the co-polyamide and the outer heat-sealing polyolefin layer b) wherein said tie layer comprises a material selected from the group consisting of
- i) an ethylene-α-olefin co-polymer having an acid functionality grafted thereon;
- ii) an ethylene-α-olefin co-polymer having an acid functionality co-polymerized therewith;
- iii) an ethylene-α-olefin co-polymer having an acid functionality blended therewith;
- iv an ethylene-α-olefin co-polymer having an anhydride functionality grafted thereon;
- an ethvlene-α-olefin co-polymer having an anhydride functionality co-polymerized therewith;
- vi) an ethylene-α-olefin co-polymer having an anhydride functionality blended therewith;
- vii) co-polymer of ethylene and an ethylenically unsaturated es-ter having an acid functionality grafted thereon;
- viii) a co-polymer of ethylene and an ethylenically unsaturated ester having an acid functionality co-polymerized therewith;
- ix) a co-polymer of ethylene and an ethylenically unsaturated ester having an acid functionality blended therewith;
- x a co-polymer of ethylene and an ethylenically unsaturated ester having an anhydride functionality grafted thereon;
- xi) a co-polymer of ethylene and an ethylenically unsaturated ester having an anhydride functionality co-polymerized therewith; and
- xii) a co-polymer of ethylene and an ethylenically unsaturated ester having an anhydride functionality blended therewith.

9. The film of claim 1 wherein
- i) the co-polyamide layer a) is an internal layer; and
- ii) the film further comprises a second outer layer d), the second outer layer
  - d) comprising a material selected from the group consisting of
    - (a) polyolefin in;
    - (b) polyamide; and
    - (c) polyester.

10. The film of claim 9 wherein the outer layer d) comprises one or more polyolefins.

11. The film of claim 1 wherein the film comprises five layers wherein tie layers c) and c') are positioned between the internal co-polyamide layer a) and the outer layers b) and d) respectively.

12. The film of claim 1 wherein the film is coextruded.

13. The film of claim 1 wherein the film is irradiated.

14. A process of manufacture of a film comprising:
a) stretching an extruded tape comprising
  - i) a layer comprising at least 50 wt.% of a crystalline or partially crystalline co-polyamide characterized by a $T_g$ less than or equal to 100° C., and
  - ii) at least one outer heat-sealing layer comprising a polyolefin in, in the machine direction with a stretching ratio of greater than or equal to 3.0:1 and in the transverse direction with a stretching ratio of greater than or equal to 6.0:1, either sequentially or simultaneously, at a suitably se-lected orientation temperature, to produce an oriented film, and then
b) heat-setting the film; such that the heat set film is characterized by a % free shrink at 100° C. less than or equal to 3 in each of the machine and transverse directions.

15. The process of claim 14 further comprising the step of ir-radiating the extruded tape before stretching the extruded tape.

* * * * *

UNITED STATES PATENT AND TRADEMARK OFFICE
CERTIFICATE OF CORRECTION

PATENT NO.       : 7,063,885 B2
APPLICATION NO. : 10/221429
DATED            : June 20, 2006
INVENTOR(S)      : Longo et al.

It is certified that error appears in the above-identified patent and that said Letters Patent is hereby corrected as shown below:

Column 16, Line 15,"polyolefin in" should be --polyolefin--
Column 16, Line 21,"stretch-ing" should be --stretching--
Column 16, Line 24,"cry-stalline" should be --crystalline--
Column 16, Line 46,"polyolefin in" should be --polyolefin--
Column 16, Line 49,"polyolefin in" should be --polyolefin--
Column 17, Line 12,"be-tween" should be --between--
Column 17, Line 21,"iv" should be --iv)--
Column 17, Line 23,"an ethylene" should be --v) an ethylene--
Column 17, Line 28,"es-ter" should be --esther--
Column 17, Line 35,"x" should be --x)--
Column 18, Line 8,"polyolefin in" should be --polyolefin--
Column 18, Line 14,"The film of claim 1" should be --The film of claim 9--
Column 18, Line 28,"polyolefin in" should be --polyolefin--
Column 18, Line 32,"se-lected" should be --selected--
Column 18, Line 40,"ir-radiating" should be --irradiating--

Signed and Sealed this

Sixth Day of February, 2007

JON W. DUDAS
*Director of the United States Patent and Trademark Office*